(12) United States Patent
Jenne et al.

(10) Patent No.: US 11,144,105 B2
(45) Date of Patent: Oct. 12, 2021

(54) METHOD AND APPARATUS TO PROVIDE PLATFORM POWER PEAK LIMITING BASED ON CHARGE OF POWER ASSIST UNIT

(71) Applicant: DELL PRODUCTS, LP, Round Rock, TX (US)

(72) Inventors: John E. Jenne, Austin, TX (US); Mark A. Muccini, Georgetown, TX (US); Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 16/175,813

(22) Filed: Oct. 30, 2018

(65) Prior Publication Data

US 2020/0133361 A1    Apr. 30, 2020

(51) Int. Cl.
| | |
|---|---|
| G06F 1/32 | (2019.01) |
| G06F 1/26 | (2006.01) |
| G06F 1/3296 | (2019.01) |
| G06F 1/3212 | (2019.01) |
| G06F 1/28 | (2006.01) |

(52) U.S. Cl.
CPC ............ *G06F 1/263* (2013.01); *G06F 1/28* (2013.01); *G06F 1/3212* (2013.01); *G06F 1/3296* (2013.01)

(58) Field of Classification Search
CPC ................................ G06F 1/32; G06F 9/44
See application file for complete search history.

(56) References Cited

U.S. PATENT DOCUMENTS

| | | | |
|---|---|---|---|
| 5,640,059 A | 6/1997 | Kammiler et al. | |
| 5,953,221 A | 9/1999 | Kühn et al. | |
| 5,982,161 A | 11/1999 | Nguyen et al. | |
| 7,529,949 B1 | 5/2009 | Ranganathan et al. | |
| 8,878,505 B2 * | 11/2014 | Temkin | H02M 3/33523 323/283 |
| 8,994,346 B2 | 3/2015 | Rahardjo et al. | |
| 9,166,442 B1 | 10/2015 | Belch | |

(Continued)

OTHER PUBLICATIONS

PCT/US19/48297 ISR dated Nov. 7, 2019, 9 pages.
PCT/US19/49048 ISR dated Nov. 8, 2019, 17 pages.

*Primary Examiner* — Keshab R Pandey
(74) *Attorney, Agent, or Firm* — Larson Newman, LLP

(57) ABSTRACT

An information handling system includes a power assist unit (PAU) and a baseboard management controller (BMC). The PAU is coupled to a power rail and includes a power storage element, a converter coupled to the power storage element and the power rail, and a controller. The controller receives a current level indication indicating a current provided to a load of the information handling system, directs the converter to provide power from the power storage element to the power rail when the current level indication is greater than a threshold level, directs the converter charge the power storage element from the power rail when the current level indication is greater than the threshold level, and provides a charge level indication that indicates an amount of charge on the power storage unit. The BMC receives the charge level indication, and sets a peak power limit for the information handling system based on the charge level indication.

20 Claims, 5 Drawing Sheets

(56) References Cited

U.S. PATENT DOCUMENTS

| | | |
|---|---|---|
| 9,703,363 B2 | 7/2017 | Zhou |
| 10,396,717 B2 | 8/2019 | Liu |
| 2002/0030543 A1 | 3/2002 | French et al. |
| 2003/0056125 A1 | 3/2003 | O'Conner et al. |
| 2005/0144495 A1 | 6/2005 | Nakajim et al. |
| 2006/0171180 A1 | 8/2006 | Kyono |
| 2007/0075693 A1 | 4/2007 | Ki |
| 2007/0079153 A1 | 4/2007 | Bain et al. |
| 2007/0115695 A1 | 5/2007 | Lou et al. |
| 2007/0188198 A1 | 8/2007 | Bird |
| 2008/0028237 A1 | 1/2008 | Knight |
| 2009/0072909 A1 | 3/2009 | Russell et al. |
| 2009/0217060 A1 | 8/2009 | Tsuchiya |
| 2009/0282275 A1 | 11/2009 | Yermalayeu et al. |
| 2010/0301674 A1 | 12/2010 | Lin |
| 2011/0072290 A1 | 3/2011 | Davis et al. |
| 2011/0107120 A1 | 5/2011 | Nakashima |
| 2011/0157934 A1 | 6/2011 | Clemo et al. |
| 2011/0316338 A1* | 12/2011 | Peterson ............... G06F 1/3206 307/29 |
| 2012/0086276 A1 | 4/2012 | Sawyers |
| 2012/0153900 A1 | 6/2012 | Schneider |
| 2012/0286757 A1 | 11/2012 | Avitan |
| 2012/0293243 A1 | 11/2012 | Suzuki |
| 2013/0143504 A1* | 6/2013 | Devara ............. H04W 52/0258 455/67.11 |
| 2013/0198532 A1 | 8/2013 | Bailey et al. |
| 2013/0200843 A1 | 8/2013 | Tanabe |
| 2013/0339757 A1* | 12/2013 | Reddy ................. G06F 1/3212 713/300 |
| 2014/0108846 A1* | 4/2014 | Berke ..................... G06F 1/28 713/340 |
| 2014/0159497 A1 | 6/2014 | Chen et al. |
| 2014/0164801 A1 | 6/2014 | Busch |
| 2014/0223214 A1 | 8/2014 | Nabhane |
| 2014/0266468 A1 | 9/2014 | Jones et al. |
| 2014/0354047 A1 | 12/2014 | Markhovsky et al. |
| 2015/0048883 A1 | 2/2015 | Vinayak |
| 2015/0106638 A1 | 4/2015 | Sun et al. |
| 2015/0115711 A1 | 4/2015 | Kouroussis et al. |
| 2015/0149793 A1 | 5/2015 | Zhou |
| 2015/0277530 A1 | 10/2015 | Rathnakar et al. |
| 2015/0338896 A1* | 11/2015 | Khatri .................... G06F 1/324 713/320 |
| 2015/0370383 A1* | 12/2015 | Oyama ................ G06F 3/0418 345/173 |
| 2015/0381026 A1 | 12/2015 | Tournatory |
| 2016/0014862 A1* | 1/2016 | Kim ...................... H05B 45/10 315/201 |
| 2016/0077570 A1 | 3/2016 | Varadarajan |
| 2016/0094121 A1 | 3/2016 | Cowley et al. |
| 2016/0118121 A1 | 4/2016 | Kelly et al. |
| 2016/0248974 A1 | 8/2016 | Tabuchi |
| 2016/0285267 A1* | 9/2016 | Stone ....................... H02J 3/32 |
| 2016/0313777 A1 | 10/2016 | Ragupathi et al. |
| 2016/0342182 A1 | 11/2016 | Deboy et al. |
| 2017/0031431 A1 | 2/2017 | Khatri et al. |
| 2017/0093158 A1 | 3/2017 | Perper et al. |
| 2017/0160777 A1 | 6/2017 | Uan-zo-li et al. |
| 2017/0187316 A1 | 6/2017 | Kobayashi |
| 2017/0277238 A1* | 9/2017 | Park ....................... G06F 1/263 |
| 2017/0352498 A1 | 12/2017 | Buehler et al. |
| 2017/0357305 A1 | 12/2017 | Kunnathur Ragupathi et al. |
| 2018/0006490 A1 | 1/2018 | Lei |
| 2018/0013295 A1 | 1/2018 | Sporck |
| 2018/0090984 A1 | 3/2018 | Ku et al. |
| 2018/0145516 A1 | 5/2018 | Yu |
| 2018/0192009 A1* | 7/2018 | Jeong ..................... H04N 7/186 |
| 2019/0036377 A1 | 1/2019 | Ou Yang et al. |
| 2019/0041969 A1* | 2/2019 | Nge ....................... G06F 1/3212 |
| 2019/0089180 A1 | 3/2019 | Sur |
| 2019/0097452 A1 | 3/2019 | Mori |
| 2019/0158776 A1 | 5/2019 | Chen |
| 2020/0033925 A1 | 1/2020 | Young |
| 2020/0174540 A1 | 6/2020 | Takatori et al. |

* cited by examiner

METHOD AND APPARATUS TO PROVIDE PLATFORM POWER PEAK LIMITING BASED ON CHARGE OF POWER ASSIST UNIT

CROSS REFERENCE TO RELATED APPLICATIONS

Related subject matter is contained in U.S. patent application Ser. No. 16/175,816 entitled "Method and Apparatus to Charge Power Assist Unit," filed Oct. 30, 2018, the disclosure of which is hereby incorporated by reference.

Related subject matter is contained in U.S. patent application Ser. No. 16/175,820 entitled "Method and Apparatus to Provide Dynamic Regulation of Power Assist Unit Output based on Active Profile," filed Oct. 30, 2018, the disclosure of which is hereby incorporated by reference.

Related subject matter is contained in U.S. patent application Ser. No. 16/175,824 entitled "Method and Apparatus for Providing High Bandwidth Capacitor Circuit in Power Assist Unit," filed Oct. 30, 2018, the disclosure of which is hereby incorporated by reference.

Related subject matter is contained in U.S. patent application Ser. No. 16/175,827 entitled "Method and Apparatus for Providing Smooth Power-On Operation with Power Assist Unit," filed Oct. 30, 2018, the disclosure of which is hereby incorporated by reference.

Related subject matter is contained in U.S. patent application Ser. No. 16/175,830 entitled "Method and Apparatus to Control Power Assist," filed Oct. 31, 2018, the disclosure of which is hereby incorporated by reference.

Related subject matter is contained in U.S. patent application Ser. No. 16/175,828 entitled "Method and Apparatus for Extending Power Hold-Up with Power Assist Unit," filed Oct. 30, 2018, the disclosure of which is hereby incorporated by reference.

Related subject matter is contained in U.S. patent application Ser. No. 16/175,831 entitled "Method and Apparatus for Providing Peak Optimized Power Supply Unit," filed Oct. 31, 2018, the disclosure of which is hereby incorporated by reference.

Related subject matter is contained in U.S. patent application Ser. No. 16/175,832, entitled "Method and Apparatus to Distribute Current Indicator to Multiple End-Points," filed Oct. 31, 2018, the disclosure of which is hereby incorporated by reference.

FIELD OF THE DISCLOSURE

This disclosure generally relates to information handling systems, and more particularly relates to providing platform power peak limiting based on the charge on power assist unit in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a power assist unit (PAU) and a baseboard management controller (BMC). The PAU may be coupled to a power rail and may include a power storage element, a converter coupled to the power storage element and the power rail, and a controller. The controller may receive a current level indication indicating a current provided to a load of the information handling system, direct the converter to provide power from the power storage element to the power rail when the current level indication is greater than a threshold level, direct the converter charge the power storage element from the power rail when the current level indication is greater than the threshold level, and provide a charge level indication that indicates an amount of charge on the power storage unit. The BMC may receive the charge level indication, and set a peak power limit for the information handling system based on the charge level indication.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
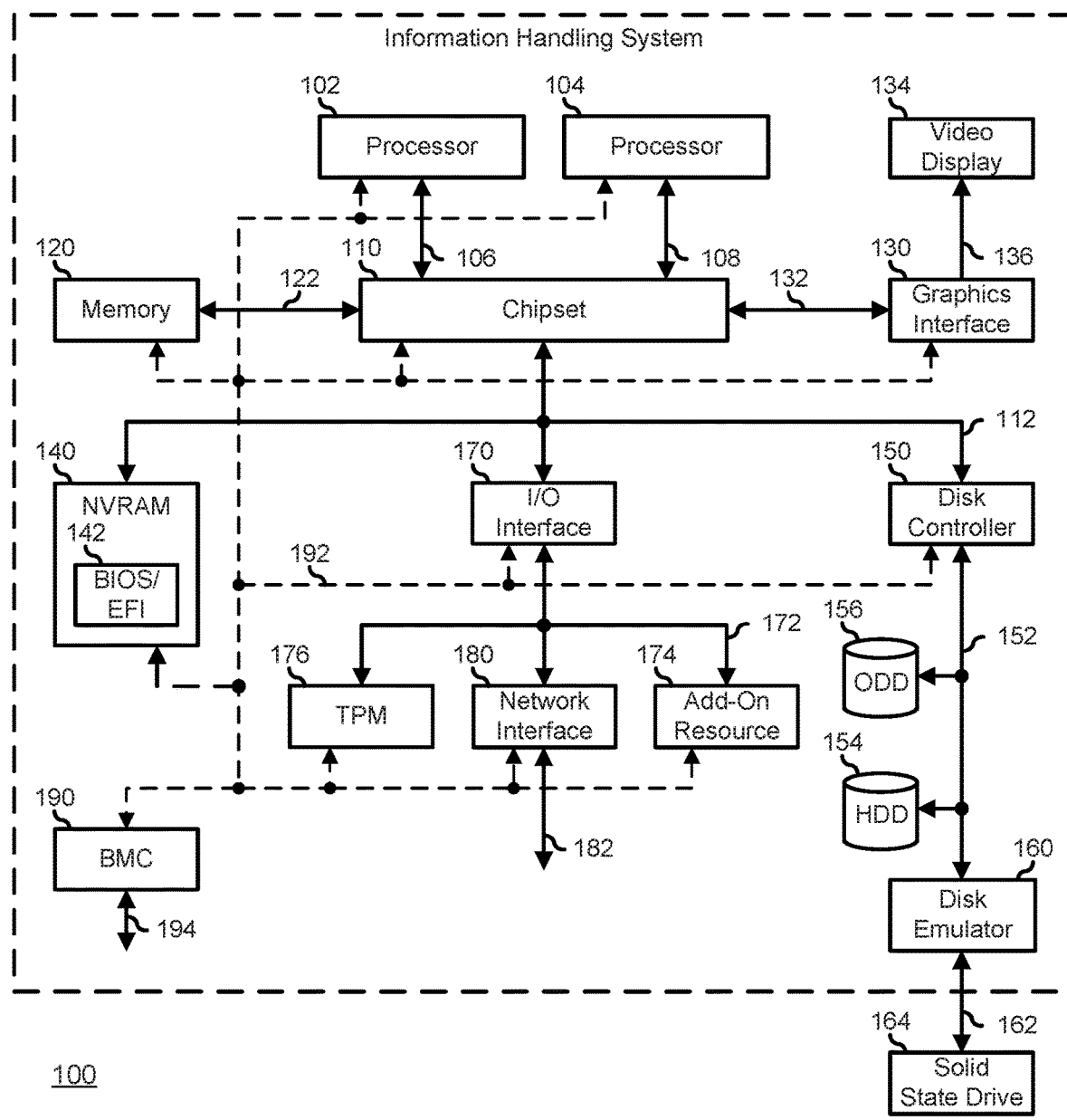
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like.

Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a WiFi channel, a near-field communication (NFC)

channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, system power loads can be extreme, not only in terms of total power consumed, but also in terms of peak power demand, rapid power demand level changes, power fault tolerance, voltage level hold-up and voltage level changes for emergency power-down operations, and other dynamic power states. As such, the typical information handling system includes a power management system to communicate and manage the various power states and changes as needed. A power system for an information handling can include power supply units (PSUs) that provide one or more voltage rails for the information handling system, CPU voltage regulators (VRs) to manage the more demanding power loads unique to the CPUs of the information handling system, and other logic and control elements as needed or desired.

As the demands of a power system for an information handling system increase, an information handling system may employ a power assist unit (PAU) coupled between the PSUs and the various loads of the information handling system, including the CPU VRs, to provide voltage rail support and peak demand current to the loads, and that are located nearer to the loads to provide cleaner and faster voltage rail support and peak demand current. In particular, prior solutions would typically provide larger PSUs to maintain voltage rail levels and supply peak current demands, and would provide a large number of capacitors close to the load elements to ensure quick response to the changing power demands of the loads. The addition of a PAU enables a middle path to ensuring power stability and capacity by providing a power storage element and control logic to couple the power storage element to the voltage rails as the loads increase. Then, when the loads decrease, the power storage element can be recharged to maintain readiness for a next load increase.

The control logic for a PAU can be programmable to provide different voltage level support and peak current support as needed or desired. For example, an information handling system may include more than one PAU, each being configured to meet the unique needs of different portions of the loads of the information handling system. Further, the control logic can provide different voltage and current regulation schemes for different load conditions or system operating states. For example, a PAU can be configured to provide support for power during demand spikes from the loads, to provide different regulation schemes in different platform load states, to assist in power hold-up during emergency power-down conditions, to buffer the power demands on the PSUs to avoid unnecessary cycling of off-duty PSUs, to smooth the power transitions when switching PSUs from off-duty to on-duty and vice versa, of provide different voltage and current regulation schemes for other load conditions or system operating states as needed or desired. Moreover, the control logic can provide different charging schemes and charging rates based upon various system states or conditions. For example, a PAU can be configured to provide different charge rates based upon an inventory of the loads of the information handling system, based upon dynamic power consumption and load conditions, based upon power caps imposed by hardware limits or management systems, as needed or desired.

Figure 2:
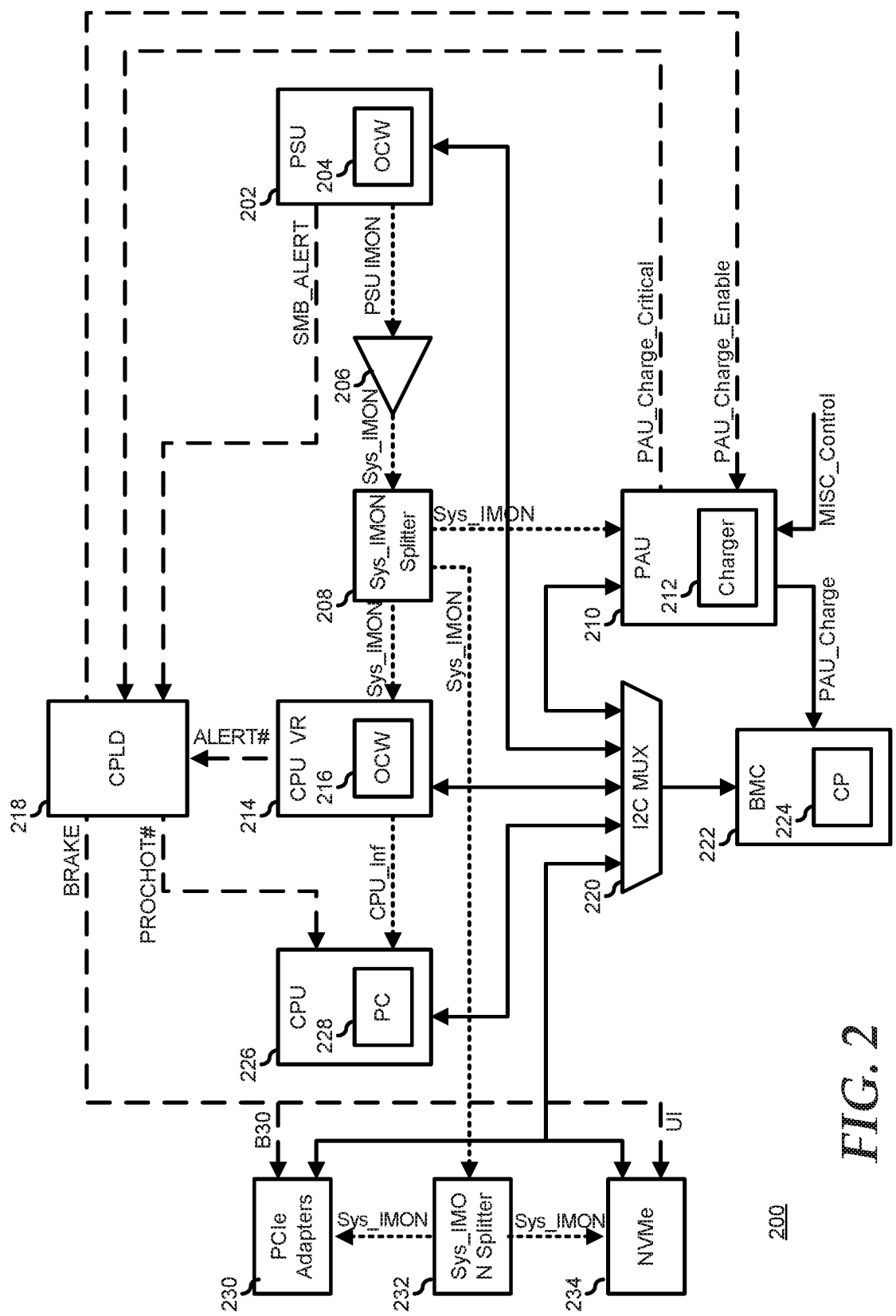
FIG. 2 is a block diagram of a power control system including a power assist unit for an information handling system according to an embodiment of the present disclosure.
Figure 3:
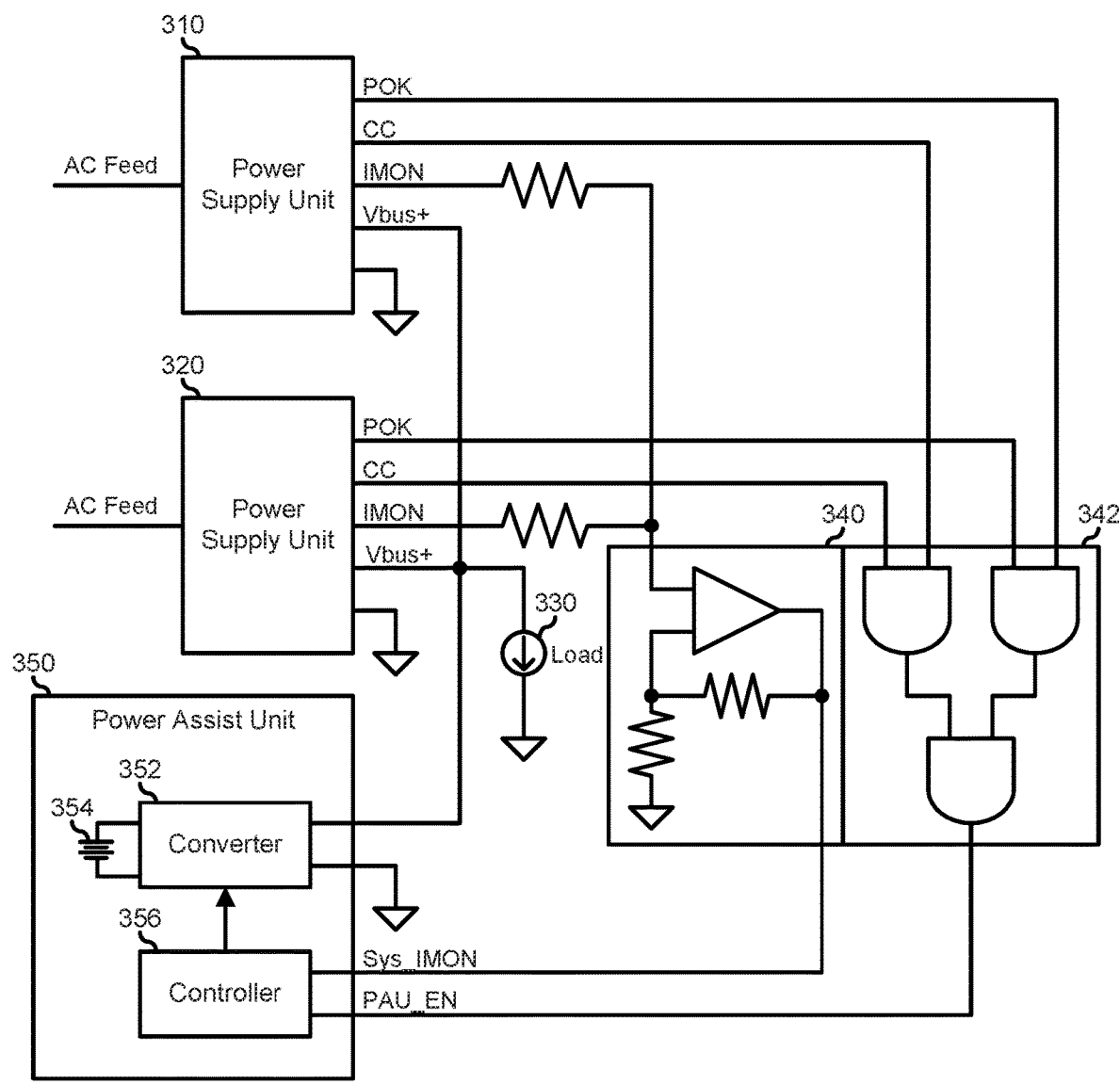
FIG. 3 is a block diagram of a power supply system including a power assist unit for an information handling system according to an embodiment of the present disclosure.

FIG. 2 illustrates a power control system 200 for an information handling system similar to information handling system 100. Power control system 200 includes one or more PSU 202, a current monitor combiner 206, a system current monitor splitter 208, one or more PAU 210, one or more CPU VR 214, a complex programmable logic device (CPLD) 218, an Inter-Integrated Circuit (I2C) interface multiplexor (I2C MUX) 220, a baseboard management controller (BMC) 222, one or more CPU 228, one or more PCIe adapter 230, another system current monitor splitter 232, and one or more Non-Volatile Memory Express (NVMe) interface 234. It will be understood that power control system 200 is representative of the various monitoring, management, and control aspects of an overall power system for an information handling system, and that FIG. 2 is not intended to show the actual power distribution network of the subject information handling system. A simplified power supply system is shown in FIG. 3, as described further, below.

PSU 202 represents a switching power converter device that receives input power (typically an alternating current (AC) power line input) and provides one or more output voltage rails (typically direct current power rails). PSU 202 is configurable to operate in various operating modes, such as a standby mode, a normal power mode, and a constant current mode. Further, based upon various platform power states enacted on the information handling system, one or more of the voltage rails may be powered on while other power rails are powered off. As such, PSU 202 includes an I2C interface that is connected via I2C MUX 220 to BMC 222 and that permits the communication of various status and configuration information to the BMC and the receipt of various control information from the BMC, as described further below. In addition, PSU 202 provides various hardware status signals to power control system 200. Such hardware status signals may include various bi-state signals, such as an over-current warning (OCW), as provided by an OCW module 204, a power-ok signal (POK), a constant current (CC) signal, an input voltage status (Vin_Good) signal, a System Management Bus (SMB) alert (SMB_ALERT) signal, or other bi-state status signals, as needed or desired. The hardware status signals may also include various analog signals such as a PSU current level (PSU_IMON) signal, or other analog signals, as needed or desired. The SMB_ALERT signal is provided to CPLD 218 in response to an over-current warning provided by OCW module 204, as described further below.

In a particular embodiment, the PSU_IMON signal is a voltage level signal, such as where PSU 202 provides a current sense resistor in a main power source, and where the PSU_IMON signal is representative of the voltage across the sense resistor. In another embodiment, the PSU_IMON signal is a current level signal, such as where PSU 202 provides a current follower circuit whose output current is based upon the current of the main power source. In either embodiment, current monitor combiner 206 operates to receive the PSU current level (PSU_IMON) signal from PSU 202 and other PSU current level signals from the one or more additional PSUs of power control system 200, and to combine the PSU current level signals to provide a system current level (Sys_IMON) signal. For example, where the PSU_IMON signals are voltage level signals, the Sys_IMON signal can be provided as an output of a voltage adder circuit such that the Sys_IMON voltage is proportional to the sum of the PSU_IMON voltages. In another example, where the PSU_IMON signals are current level signals, the Sys_IMON signal can be provided as an output of a current adder circuit such that the Sys_IMON current is proportional to the sum of the PSU_IMON currents. It will be understood that where a particular PSU is dedicated to providing power for a particular portion of an information handling system, such as a sub-system of the information handling system, that a current monitor combiner similar to current monitor combiner 206 may be utilized to provide a current level signal for the portion or sub-system of the information handling system, as needed or desired. Note that the Sys_IMON signal is indicative of a total amount of current being provided by PSU 202 and the one or more additional PSUs, and should not be confused with a total current being provided to a load of the information handling system. In particular, PAU 210 alternatively provides current to the load, or receives current from PSU 202 and the one or more additional PSUs to charge a power storage device of the PAU, as described further, below. As such, the total current being provided to the load will either be greater than the current indicated by the Sys_IMON signal (when PAU 210 provides current to the load), or less than the current indicated by the Sys_IMON signal (when the PAU receives current to charge the power storage device).

In a typical information handling system, the Sys_IMON signal is received by CPU VR 214 as a current proportional signal, and the CPU VR conditions the power provided to CPU 226 based upon the Sys_IMON signal. For example, CPU VR 214 can determine that PSU 202 is providing less than a fully rated power level to the information handling system, and in response, the CPU VR can increase a voltage level to CPU 226 to increase the performance of the CPU, thereby utilizing more of the power capacity of PSU 202. In another example, CPU VR 214 can determine that PSU 202 is providing at or near the fully rated power level to the information handling system, and in response, the CPU VR can decrease the voltage level to CPU 226 to decrease the performance of the CPU, thereby reducing the power utilization of PSU 202. In a typical case, memory devices of the information handling system, such as one or more Dual In-line Memory Modules (DIMMs) may share a power rail with CPU 226, and thus the Sys_IMON signal can be utilized to optimize the power consumption of the memory devices. As such, the Sys_IMON signal is utilized in power control system 200 to prospectively inform CPU VR 214 of power conditions on the information handling system, such that the CPU VR can proactively respond to the power conditions to better utilize PSU 202. CPU VR 214 provides information as to the status and operation of the CPU VR (CPU_Inf) to CPU 226, such that the CPU can condition the processing operations of the CPU upon the information, as needed or desired. CPU VR 214 further includes an I2C interface that is connected via I2C MUX 220 to BMC 222 and that permits the communication of various status and configuration information to the BMC and the receipt of various control information from the BMC, as described further below. In addition, CPU VR 214 provides an overcurrent alert (ALERT #), as provided by an OCW module 216 to CPLD 218, as described further below.

In the present embodiment, power control system 200 provides the Sys_IMON signal to PAU 210, to PCIe adapter 230, to NVMe interface 234, and to other elements of the information handling system, so that the PAU, the PCIe adapter, the NVMe interface and the other elements of the information handling system may prospectively be informed of the power conditions on the information handling system, and can proactively respond to the power conditions to better utilize PSU 202. However, because the Sys_IMON signal is a current proportional signal, the Sys_IMON signal cannot be fanned out to PAU 210, to PCIe adapter 230, to NVMe interface 234, and to other elements of the information handling system directly. Instead, the Sys_IMON signal from current monitor combiner 206 is provided to system current monitor splitter 208 to generate multiple copies of the Sys-IMON signal. In particular, system current monitor splitter 208 provides individual copies of the Sys_IMON signal to CPU VR 214, to PAU 210, and to system current monitor splitter 232. Further, system current monitor splitter 232 provides individual copies of the Sys_IMON signal to PCIe adapter 230 and to NVMe interface 234. For example system current monitor splitters 208 and 232 can utilize current mirror circuits that generate one or more mirrored current signal outputs based upon a received current signal input. CPU VR 214 is typically provided in conjunction with or by a manufacturer of CPU 226. As such, the requirements associated with the Sys_IMON signal are typically defined by a specification for CPU VRs that may be published by the manufacturer of the CPU. For example, the Sys_IMON signal may be analogous to various system level power signals as specified in various specifications published by one or more microprocessor manufacturer. Here, each device of power control system 200 that receives Sys_IMON will be understood to be in compliance with the particular CPU VR specification.

CPLD 218 represents a programmable device that provides various logic functions for the information handling system that utilizes power control system 200. In particular, CPLD 218 includes multiple general purpose I/O (GPIOs) and is programmed to provide various relations between the signals received on the GPIOs and the signals provided on the GPIOs. As such, CPLD 218 is configured to receive the SMB_ALERT signal from PSU 202, the ALERT # signal from CPU VR 218, and a PAU critical charge level indication (PAU_Critical_Charge) from PAU 210, as described further below. CPLD 218 is further configured to provide a PAU charge enable signal (PAU_Charge_Enable) to PAU 210, a processor over-temperature signal (PROCHOT #) to CPU 226, and power brake (BRAKE) signals to PCIe adapter 230 (B30), and NVMe interface 234 (UI), as described further below.

PCIe adapter 230 represents one or more PCIe root ports and endpoint devices of the information handling system that includes power control system 200. In a particular embodiment, the Sys_IMON signal is received by PCIe adapter 230 as a current proportional signal as split by Sys_IMON splitter 232. In another embodiment, where PCIe adapter 230 is configured to receive a voltage proportional signal, the Sys_IMON signal is converted into the voltage proportional signal, such as by including a to convert the current proportional signal to the voltage proportional signal. In either case, PCI adapter 230 conditions its power profile based upon the Sys_IMON signal. For example, PCIe adapter 230 can determine that PSU 202 is providing less than a fully rated power level to the information handling system, and in response, the PCIe adapter can increase its performance, thereby utilizing more of the power capacity of PSU 202. In another example, PCIe adapter 230 can determine that PSU 202 is providing at or near the fully rated power level to the information handling system, and in response, the PCIe adapter can decrease its performance, thereby reducing the power utilization of PSU 202. PCIe adapter 230 further includes an I2C interface that is connected via I2C MUX 220 to BMC 222 and that permits the communication of various status and configuration information to the BMC and the receipt of various control information from the BMC, as described further below. It will be understood that PCIe adapter 230 may represent two or more PCIe adapters that each receive a separate Sys_IMON signal from Sys_IMON splitter 232, as needed or desired.

NVMe interface 234 represents one or more non-volatile memory controller of the information handling system that includes power control system 200. In a particular embodiment, the Sys_IMON signal is received by NVMe interface 234 as a current proportional signal as split by Sys_IMON splitter 232. In another embodiment, where NVMe interface 234 is configured to receive a voltage proportional signal, the Sys_IMON signal is converted into the voltage proportional signal, such as by including a to convert the current proportional signal to the voltage proportional signal. In either case, NVMe interface 234 can determine that PSU 202 is providing less than a fully rated power level to the information handling system, and in response, the NVMe interface can increase its performance, thereby utilizing more of the power capacity of PSU 202. In another example, NVMe interface 234 can determine that PSU 202 is providing at or near the fully rated power level to the information handling system, and in response, the NVMe interface can decrease its performance, thereby reducing the power utilization of PSU 202. NVMe interface 230 further includes an I2C interface that is connected via I2C MUX 220 to BMC 222 and that permits the communication of various status and configuration information to the BMC and the receipt of various control information from the BMC, as described further below. It will be understood that NVMe interface 234 may represent two or more NVMe interfaces that each receive a separate Sys_IMON signal from Sys_IMON splitter 232, as needed or desired. It will be further understood that the I2C interface of NVMe interface may share a common I2C bus with the I2C interface of PCIe adapter 230. Further, it will be understood that power management system 200 may include one or more additional subsystem, such as a network interface device (NIC), a storage adapter, or another subsystem of an information handling system that may receive the Sys_IMON signal and adapt the performance of the subsystem accordingly, as needed or desired.

PAU 210 is a power source that is connected between PSU 202 and the loads of the information handling system, as shown and describe with respect to FIG. 3, below, to provide cleaner and faster voltage rail support and peak demand current to the loads of the information handling system. PAU 210 includes control logic, as shown and described with respect to FIGS. 3-5, below, to provide different voltage level support and peak current support as needed or desired. For example, an information handling system may include more than one PAU, each being configured to meet the unique needs of different portions of the loads of the information handling system. Further, the control logic can provide different voltage and current regulation schemes for different load conditions or system operating states. For example, PAU 210 receives the Sys_IMON signal from Syis_IMON splitter 201 and provides support for power during demand spikes from the loads, as described further below. PAU 210 also receives various control, state, and status signals, shown here as a (Misc_Control) signal, and provides different regulation schemes in different platform load states. PAU 210 also assists in power hold-up during emergency power-down conditions, buffers the power demands on PSU 202 to avoid unnecessary cycling of off-duty PSUs, and smooths the power transitions when switching PSUs from off-duty to on-duty and vice versa. PAU 210 provides different voltage and current regulation schemes for other load conditions or system operating states as needed or desired. Moreover, PAU 210 provides different charging schemes and charging rates based upon various system states or conditions. For example, PAU 210 can be configured to provide different charge rates based upon an inventory of the components of the information handling system and known or assumed loads of the loads of the components, based upon a measurement of the dynamic power consumption and load conditions, based upon power caps imposed by hardware limits or management systems, as needed or desired. PAU 210 further includes an I2C interface that is connected via I2C MUX 220 to BMC 222 and that permits the communication of various status and configuration information to the BMC and the receipt of various control information from the BMC, as described further below. PAU 210 provides the PAU_Critical_Charge signal to CPLD 218 and receives the PAU_Charge_Enable signal from the CPLD. Finally, PAU 210 includes a charger 212 that provides a charge status indication (PAU_Charge) to BMC 222, as described further below. In general, PAU 210 operates with the goal to maintain PSU 202 and the one or more additional PSUs to operate at 100% of their rated operating current. Thus, when the PSUs are all operating at 100% rated operating current level, then, when load conditions increase, PAU 210 operates to provide current to the load that would otherwise be provided in a peak current supply condition by the PSUs, that is, PAU 210 operates to provide current to feed the demand of spikes in the load. Further, when the PSUs are all operating at 100% rated operating current level, then, when load conditions decrease, PAU 210 operates to draw current from the PSUs to recharge the power storage device. As such, in an optimal case, the PSUs all operate at 100% of their rated operating current level at all times, and all current peaks in the demand of the load are supplied by PAU 210, and all current drops in the demand of the load are absorbed by the PAU to recharge the power storage device.

I2C MUX 220 operates to multiplex I2C busses from PSU 204, PAU 210, CPU VR 214, CPU 226, PCIe adapters 230, and NVMe interface 234 to an I2C interface of BMC 222. Here, BMC 222 operates to monitor, manage, and maintain the operations of PSU 204, PAU 210, CPU VR 214, CPU 226, PCIe adapters 230, and NVMe interface 234 via communications over the various I2C busses. In particular, BMC 222 may include a processor that runs management code to perform the functions of the BMC, and may further include a co-processor that, under the direction of the management code, offloads the BMC processor from various repetitive tasks, such as I2C service routines. It will be understood that the configuration of the I2C busses and I2C MUX 220 are exemplary, and that the information handling system that utilizes power control system 200 may employ an I2C bus configuration that is different than the one shown herein. Moreover, it will be understood that the communications between BMC 222 and PSU 204, PAU 210, CPU VR 214, CPU 226, PCIe adapters 230, and NVMe interface 234 may be via other communication standards, as needed or desired. For example, the communication between BMC 222 and CPU 226 may be channeled via an I2C bus to a Platform Controller Hub (PCH) that is in communication with the CPU, or the BMC may communicate directly with the CPU via a Platform Environment Control Interface (PECI), as needed or desired.

In operation, power control system 200 provides three mechanisms for controlling the flow of power to the loads of the information handling system that includes the power control system: a hardware protection mechanism as shown by the dashed signal lines, a fast firmware control loop as shown by the dotted signal lines, and a slow firmware control loop as shown by the solid signal lines. The hardware control mechanism is the fastest control mechanism and is primarily controlled by CPLD 218. Further, the hardware control mechanism provides a coarsest response, such as by applying a maximum throttling to the operations of the information handling system, and thus degrades performance more that the fast or slow firmware control loops. Here, CPLD 218 receives the SMB_ALERT signal from PSU 202, the PAU_Charge Critical signal from PAU 210, and the ALERT # signal from CPU VR 214. These signals each provide an indication that the respective sending element is in a critical load condition. For PSU 202 and CPU VR 216, the critical load conditions represent the fact that the PSU or the CPU VR are at a maximum loading and can supply no further current to their respective loads, leading to a potential voltage drop on one or more of their power rails. For PAU 210, the critical load condition, as indicated by the assertion of the PAU_Charge Critical signal, represents the fact that a power storage element of the PAU has been discharged to a critical level, such that the PAU is no longer able to provide power to the various voltage rails as needed. When CPLD 218 receives one or more of the critical load condition signals, the CPLD provides the PROCHOT # signal to CPU 226. In response, CPU 226 takes actions to lower the power consumption of the CPU, such as by lowering a performance state of the CPU by lowering an operating frequency or an operating voltage of the CPU, or shutting down internal units of the CPU, as needed or desired. CPLD 218 further responds to one or more of the critical load condition signals by providing the BRAKE signal to PCIe adapter 230 and NVMe interface 234. In response, PCIe adapter 230 and NVMe interface 234 take actions to lower their power consumption. The particular steps taken by a CPU, a PCIe adapter or device, or a NVMe interface to lower their respective power consumption are known in the art and are beyond the scope of the present disclosure, and will be described no further herein except as needed to further describe the present embodiments. Finally, when CPLD 218 is receiving no critical load condition signal, the CPLD provides the PAU_Charge_Enable signal to PAU 210 to indicate that no other device of power control system 200 is in a critical load condition, and that the PAU can opportunistically charge its storage device as needed. Note that the control of PAU 210 may be provided by CPLD 218 based upon the exact conditions of the critical load condition. For example, if the SMB_ALERT signal is asserted, then CPLD 218 can assert the BRAKE signal and de-assert the PROCHOT # an PAU_Charge_Enable signals, while if the PAU_Charge Critical signal is asserted, the CPLD can assert the BRAKE signal and de-assert the PROCHOT # signal, but can also keep the PAU_Charge_Enable signal asserted in order to permit PAU 210 to recharge. Note further that other hardware power control signals may be provided in a typical information handling system and that may make up other functions of the hardware protection mechanism. For example, a particular architecture may include a MEMHOT # or EVENT # signal for memory components. Other hardware based power control signals may be provided on other architectures, and such signals will be understood to be included in a hardware protection mechanism, as needed or desired. Further, the distinction between the hardware protection mechanism and the fast and slow firmware control loops is not intended to be exclusive. For example, a CPLD may further operate in response to a critical load condition to provide an interrupt to a BMC, and the BMC may then apply specific firmware-based controls in response.

The fast firmware control loop consists of the PSU_IMON signal and the distributed Sys_IMON signals. Here, CPU VR 214, PCIe adapter 230, and NVMe interface 234 respond to variations in the system current level, as indicated by the Sys_IMON signal, as described above. In a particular embodiment, PAU 210 receives the Sys_IMON signal and operates to provide current to the loads of the information handling system when the system current level exceeds a particular threshold. In another embodiment, PAU 210 monitors a voltage level of a particular voltage rail, and when the voltage drops below a threshold level, the PAU provides current to sustain the voltage rail at a voltage level above the threshold level. It will be understood that control of PAU 210 based upon the system current level may provide a quicker indication of the onset of a voltage drop condition than control based upon the voltage level, and so may present a more desirable solution. In yet another embodiment, PAU 210 operates based upon both the system current level and the voltage levels of the various voltage rails.

The slow firmware control loop consists primarily of the I2C interfaces, through which BMC 222 operates to monitor, manage, and maintain PSU 202, PAU 210, CPU VR 214, CPU 226, PCIe adapter 230, and NVMe interface 234, and the various control, state, and status (Misc_Control) signals received by PAU 210. The slow firmware control loop provides different regulation schemes in different platform load states, such as during emergency power-down conditions, PSU on-duty/off-duty cycling or other load conditions or system operating states as needed or desired. Moreover, the slow firmware control loop provides different PAU charging schemes and charging rates based upon various system states or conditions.

FIG. 3 illustrates a power supply system 300 including PSUs 310 and 320, a load 330, a current reference 340, PAU enable logic 342, and a PAU 350 similar to PAU 210. PSUs 310 and 320 each include an AC power feed to receive power from a power distribution system, and operate to provide one or more regulated output voltage (Vbus+) to load 330. PSUs 310 and 320 also each provide an input power-ok (POK) signal that indicates that the power on the AC power feed is good, a constant current (CC) signal that indicates that the respective PSU is operating at a maximum rated current, and a PSU IMON signal that indicates the amount of current being supplied by the respective PSU. In a particular embodiment, one or more of the CC and POK signals are provided by a GPIO of PSUs 210 and 220. The PSU_IMON signals are current-level signals that are proportional to the current supplied by the respective PSUs. The PSU_IMON signals are summed and provided as an input to current reference 340 that provides a Sys_IMON signal output to PAU 350. In a particular embodiment, the Sys_IMON signal is the average of the individual PSU_IMON signals.

PAU enable logic 342 receives the POK and CC signals from PSUs 310 and 320, and provides an enable (PAU Enable) signal to PAU 350. In a particular embodiment, the POK signals are provided to the inputs of a first AND-gate, and the CC signals are provided to the inputs of a second AND-gate. The outputs of the first and second AND-gates are provided to the inputs of a third AND-gate. The output of the third AND-gate provides the PAU Enable signal. Thus, in this embodiment, the PAU Enable signal ensures that PAU 250 is not activated unless both PSUs 210 and 220 are operating at a full capacity, as indicated by their respective CC signals. Thus, when one or both PSUs 210 and 220 are not operating at their full capacity, PAU 250 will not provide current to load 230, thereby permitting any additional demand from the load to be provided by the PSUs. Further, the PAU Enable signal ensures that PAU 250 is not activated unless both PSUs 210 and 220 are receiving good power on its respective AC power feed. Other mechanisms for providing a PAU Enable signal may be utilized as needed or desired.

PAU 350 includes a power converter 352, a power storage element 354, and a controller 356. Power converter 352 operates in a first mode to receive electrical power from power storage element 354 and provides regulated current to load 330 in parallel with the regulated power outputs (Vbus+) of PSUs 210 and 220, as directed by controller 356. In a second mode, power converter 352 operates to receive power from the regulated power outputs (Vbus+) of the PSUs 210 and 220 to charge power storage element 354. In a particular embodiment, converter 352 represents a switching power supply circuit that is driven by a pulse width modulated input signal from controller 356. Generally, when the PSU Enable signal is asserted, then controller 356 drives converter 354 to provide current based upon the current level indicated by the Sys_IMON signal. When the PSU Enable signal is de-asserted, then controller 356 drives converter 354 to maintain a voltage level at or slightly below the voltage level of the regulated power outputs (Vbus+) of PSUs 210 and 220. For example, where the regulated power output (Vbus+) is 12V, then, if controller 356 drives converter 354 to maintain a voltage level at 11.5V, then PAU 250 can be placed into the second charging mode. Further, the charge rate can be determined based upon the state of the Sys_IMON signal, such that, when the Sys_IMON signal indicates that the average current drawn by load 330 is low, then PAU 250 can be in a high charge rate state of the charging mode, while when the Sys_IMON signal indicates that the average current drawn by load 330 is high, then PAU 250 can be in a low charge rate state of the charging mode. Power storage element 354 represents a rechargeable power source, such as a supercapacitor, a rechargeable battery, or another rechargeable power source as needed or desired. In a particular embodiment, controller 356 implements a programmable Sys_IMON threshold. Here, a BMC can communicate with PAU 350 via an I2C interface and can set a Sys_IMON threshold level such that controller 356 switches to the mode to provide regulated current to load 330 when the Sys_IMON signal is above the Sys_IMON threshold.

It will be noted that PSUs 210 and 220 typically provide power on two or more voltage rails at different voltage levels supply different sub-systems of the information handling system that includes power supply system 300. In a particular embodiment, power supply system 300 includes separate current references similar to current reference 340, separate PAU enable logics similar to PAU enable logic 342, and separate PAUs similar to PAU 350 for each voltage rail. In another embodiment, power supply system 300 includes separate current references similar to current reference 340 and separate PAU enable logics similar to PAU enable logic 342, but a single PAU includes a separate converter similar to converter 354 and a separate controller similar to controller 356 for each voltage rail. Here, the PAU can also include a single power storage element similar to power storage element 354 that powers each converter, or the PAU can include separate power storage elements for each converter.

Figure 4:
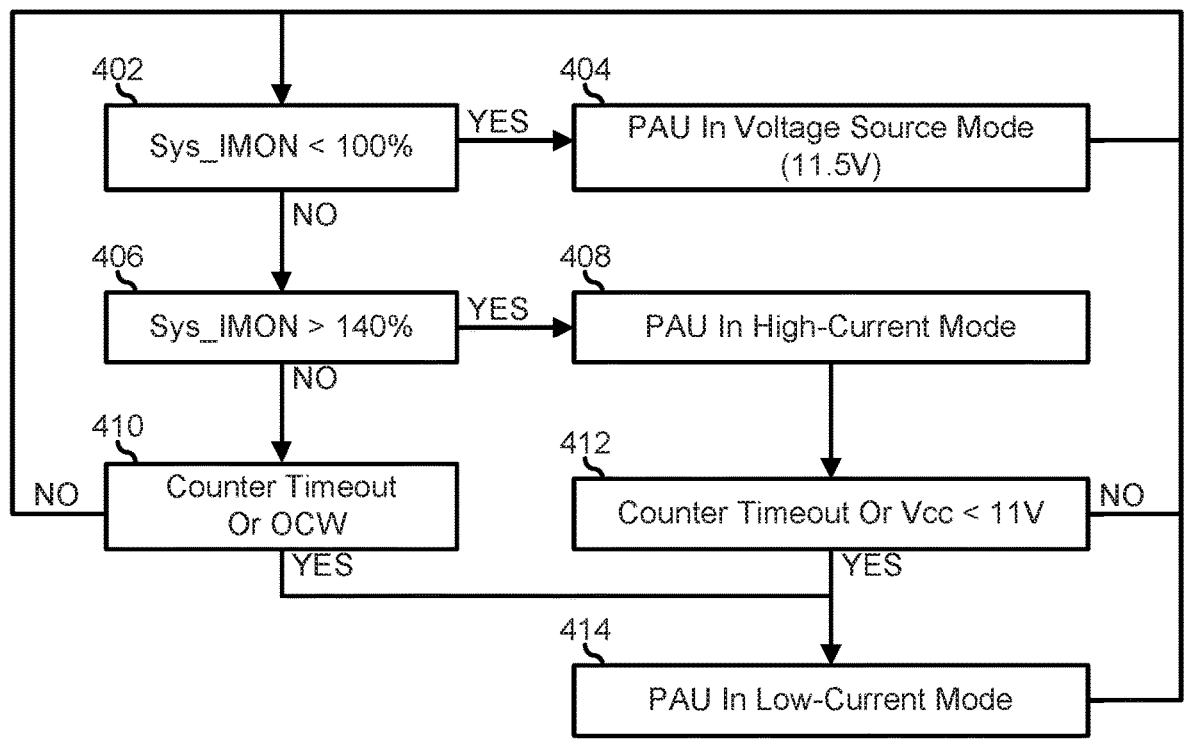
FIG. 4 illustrates a method of controlling a PAU.

FIG. 4 illustrates a method 400 of controlling a power assist unit starting at decision block 402 where a determination is made as to whether or not a Sys_IMON signal for a power control system indicates that the associated information handling system is operating at less than 100% current level. If so, the "YES" branch of decision block 402 is taken, a PAU of the power control system operates in a voltage source mode in block 404, and the method continues to loop back to decision block 402 until the information handling system begins to operate at greater than 100% current level. Here, in an exemplary case, the PAU operates as a voltage source at 11.5 V and the PAU can charge up the power storage element in the voltage source mode. When the Sys_IMON signal indicates that the associated information handling system is not operating at less than 100% current level, that is, that the information handling system is operating at greater than the 100% current level, the "NO" branch of decision block 402 is taken and a decision is made as to whether or not the Sys_IMON signal indicates that the associated information handling system is operating at greater than a pre-determined current level (here shown at an exemplary 140% current level) in decision block 406. If not, the "NO" branch of decision block 406 is taken and a decision is made as to whether or not one of a counter times out or an OCW indication is given by a PSU of the power control system in decision block 410. For example, a controller for a PSU may wait for 5 milli-seconds (ms) before changing from the voltage source mode in order to permit the PSUs to handle shorter peak loads before engaging the operation of the PAU. If neither a counter times out nor an OCW indication is given, the "NO" branch of decision block 410 is taken and the method continues to loop back to decision block 402 until the information handling system begins to operate at greater than 100% current level.

If either the counter times out or the OCW indication is given, the "YES" branch of decision block 410 is taken and the method proceeds to block 414, as described further below. Returning to decision block 406, if the Sys_IMON signal indicates that the associated information handling system is operating at greater than the pre-determined current level, the "YES" branch is taken, and the PAU is operated in a current source mode in block 408, and the method proceeds to decision block 412. In decision block 412, a decision is made as to whether or not one of another timer times out or the voltage rail drops below a threshold voltage level. If neither the second counter times out nor the voltage rail drops below the threshold voltage level, the "NO" branch of decision block 412 is taken and the method continues to loop back to decision block 402 until the information handling system begins to operate at greater than 100% current level. For example, the controller of the PSU may wait for 5 ms before changing from the high-current source mode in order to permit the PAUs to handle the peak loads before disengaging operation and resuming operation of the PAU. If either the second counter times out nor the voltage rail drops below the threshold voltage level, the "YES" branch of decision block 412 is taken, the PAU is operated in the current source mode in block 414, and the method continues to loop back to decision block 402 until the information handling system begins to operate at greater than 100% current level.

In a particular embodiment, a power supply system similar to power supply system 300 includes two or more PAUs that support a common voltage rail, where each PAU is physically located proximate to a particular load on a printed circuit board of an information handling system. For example, a separate PAU may be dedicated to each one of two or more processors of the information handling system. In another example, a first PAU may be dedicated to the one or more processors of the information handling system, while a second PAU may be dedicated to other loads of the information handling system. In either example, the separate PAUs can be physically co-located with the particular load that they are intended to support. Here, each PAU supports the implementation of different control schemes for charging and discharging their respective power storage elements. For example, the triggering conditions (such as enable signal conditions, Sys_IMON trigger thresholds, and the like) for providing current support on each PAU my differ, as may discharge thresholds (such as minimum charge levels to be maintained in order to provide current support), discharge rates, and the like. Moreover, the operational characteristics of a PAU may be based upon the type of triggering event or charging environment. For example, the discharge characteristics may differ in a PAU based upon whether the triggering event is hardware based, fast firmware control loop based, or slow firmware control loop based. In another example, the charging characteristics may differ in a PAU based upon similar considerations as the discharging characteristics. Thus, it will be understood that a PAU is programmable and the particular operational characteristics of a PAU can be configured as needed or desired to meet the needs of the particular information handling system. As such, it will be further understood that a PAU may include an embedded controller, logic state-machine, programmable array, or the like that provides for the programmability of the PAU, for example by a BMC of the information handling system over an I2C or other data interface. The specifics of providing embedded control are known in the art and will not be further disclosed herein except as needed to illustrate the present embodiments.

In a particular embodiment, a PAU similar to PAUs 210 and 350 provides active control of the charge rate of the power storage element. For example, by monitoring the Sys_IMON signal, a PAU can determine to provide more charging to the power storage element when the system current is low and provide less charging to the power storage element when the system current is higher. In another example, a BMC can configure the PAU charge rate over an I2C or other data interface, based upon conditions of the information handling system that are not directly related to the current state of the Sys_IMON signal. Here, based upon out of band management of the information handling system, the BMC may know that a time based event that changes the processing load of the information handling system is about to occur, and can therefore direct the PAU to charge at a rate that differs from that dictated by the Sys_IMON signal alone. For example, where the information handling system is scheduled to experience greater processing loads soon, the PAU may be directed to charge at a higher rate, pushing the system power budget to closer to a maximum state, in anticipation of the greater processing loads. In another example, the BMC can poll the power usage of various elements of the information handling system and direct the PAU to change a charging rate based upon the power usages. Here, for example, the BMC may determine that a large portion of the present power usage is by a processor as compared to other elements of the information handling system, and may therefore direct the PAU to charge the power storage element at a lower rate because the processor load is more unpredictable.

In a particular embodiment, the charge rate of a PAU is further determined based upon an inventory of the elements of the information handling system. Here, a BMC maintains an inventory of the elements of the information handling system, and further maintains a power budget for each element. The BMC then determines a maximum charge rate for the PAU ($CR_{Max}$) as:

$$CR_{Max} = P_{Available} - P_{Budget} \quad \text{Equation 1.}$$

Here $P_{Available}$ is the available power capacity, and is given as:

$$P_{Available} = \Sigma C_{PSU} \quad \text{Equation 2}$$

where $\Sigma C_{PSU}$ is the sum of the capacities of the active PSUs. $P_{Budget}$ is the information handling systems power budget, and is given as:

$$P_{Budget} = CPU + Memory + Storage + Fans + Misc. \quad \text{Equation 3.}$$

Here, even though the PSU may determine that, based upon the Sys_IMON signal, the power storage element may be charged at a particular rate, nevertheless, based upon the inventory, the PSU may maintain the charge rate at or below the maximum charge rate $CR_{Max}$.

In another embodiment, the charge rate of a PAU is further determined based upon an imposed power cap for the information handling system. Here, the BMC may be provided with a direction to lower the power consumption of the information handling system, based upon a datacenter thermal condition, a workload management condition, or the like. As such, the BMC can direct the PAU to enforce a lower maximum charge rate ($CR_{Max}$) in order to lower to total power consumption of the information handling system.

Figure 5:
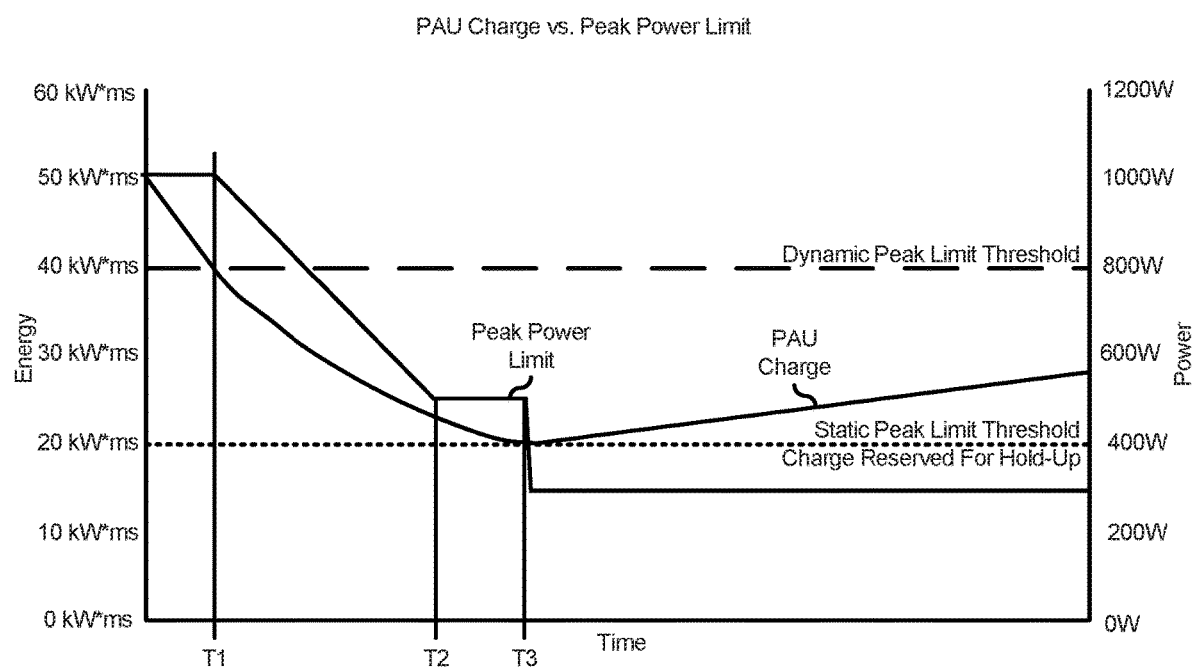
FIG. 5 is a graph showing power assist unit charge versus a peak power limit according to an embodiment of the present disclosure.

In a particular embodiment, a PAU monitors and manages the charge level on the associated power storage device, and communicates the charge level information to a power management system, for example via a I2C interface to a BMC of the power management system. Here, the power management system operates to manage the system power states for the various elements of the information handling system based upon the charge level information. FIG. 5 illustrates PAU charge versus a peak power limit in an example of this embodiment. Here, a charge level, or energy, for a power storage element is given on the left vertical axis in kilowatt*milliseconds (kW*ms), and a power level is given on the right vertical axis in watts (W). With respect to the charge level, a PAU can be configured to implement one or more energy level thresholds that influence the power assist and recharge behavior of the PAU. As illustrated, the PAU implements a dynamic peak limit threshold at 40 kW*ms, and a static peak charge reserve threshold at 20 kW*ms. When the PAU charge is above the dynamic peak limit threshold, the PAU operates in an unrestricted peak assist mode, where the PAU operates to provide current in accordance with the control mechanisms as described above, such as in response to the Sys_IMON signal. The charge on the power storage device is shown to be linearly decreasing over time. Here, it is assumed that the information handling system is operating in a mode that is utilizing substantially a maximum amount of peak assistance from the PAU. Thus the linear decrease is merely exemplary, and in a real system, the charge on a power storage device may decrease at different rates if less peak assistance is utilized by the information handling system, and the charge may also increase if no peak assistance is being utilized and the power storage device is being recharged by the PAU.

In this unrestricted peak assist mode, the peak power limit for the information handling system is at a maximum level, here shown as 800 W. The peak power limit may be understood as a power limit for the information handling system or for one or more elements of the information handling system, as needed or desired. In other words, the peak power limit as used herein may be assessed on all of the elements of the information handling system by driving an overall power supplied by the PSUs, may be on a per-power-rail basis, may be on a device basis such as where the power of the one or more CPUs of the information handling system are carefully managed in accordance with a VR specification, or on the basis of another grouping of power rails or elements of the information handling system. Moreover, as described above, a power management system may include one or more PAUs for different power rails, or a PAU may operate separately for the different power rails. So, here, the illustrated PAU charge versus Peak Power Limit is exemplary, and may be understood to represent one of several power management schemes, each being implemented for a different power rail of set of elements of the information handling system.

At a time (T1), the charge on the power storage device drops below the dynamic peak limit threshold, and the PAU communicates this fact to the power management system. The power management system responds by gradually lowering the peak power limit for the information handling system in order to lessen the demand on the peak assistance provided by the PAU. The lowering of the peak power limit may be accomplished on an information handling system by means and methods as are known in the art, and may include gradual throttling of CPUs, lowering of performance levels on various subsystems of the information handling system, or other gradual methods to lower the power of an information handling system. In a particular example, a CPU typically permits a power management system to adjust maximum current limits in the CPU. For example, a particular CPU may incorporate power control mechanisms that permit the specifying of the CPU current limit with a 1 Amp granularity. Here, as the PAU charge is detected to continue decreasing, the power management system may gradually lower the CPU current limit in, for example 10 Amp steps, 20 Amp steps, 50 Amp steps, or any other desired granularity, as needed or desired. After the time T1, the PAU charge is seen to decrease at a slower rate than before the time T1. This should not be understood to indicate a change in the power assist behavior of the PAU, per se, but rather is reflective of the fact that, with a lower peak power limit, the amount of peak assistance provided by the PAU generally decreases because the PSUs are more capable of meeting the peak loads when the peak power limit is lower.

At a time, T2, the power management system has lowered the peak power limit to a level that represents a lowest power limit level within the finely adjustable power management mechanisms of the information handling system. For example, where the CPU permits the power management system to adjust the maximum current limits in the CPU, the time T2 may represent a time when the power management system has set the CPU to the lowest maximum current limit, without invoking hardware power shedding mechanisms such as those implemented by a hardware control loop as described above, here illustrated as 500 W. After the time T2, the PAU charge is seen to decrease at a lower linear rate than before the time T2. As above, this should not be understood to indicate a change in the power assist behavior of the PAU, per se, but again is reflective of the fact that, with a lower peak power limit, the amount of peak assistance provided by the PAU generally decreases. Further, as noted above, the general decrease in the charge of the PAU after the times T1 and T2 should be seen as exemplary, and in a real system, the charge on a power storage device may decrease at different rates if less peak assistance is utilized by the information handling system, and the charge may also increase if no peak assistance is being utilized and the power storage device is being recharged by the PAU.

At a time, T3, the charge on the power storage device reaches the static peak limit threshold of 20 kW*ms. This level is typically specified as a minimum charge needed to maintain the information handling system in a voltage hold-up mode that is reserved for power loss situations. Here, such a reserve charge level may be maintained to provide power for an Asynchronous DRAM Refresh (ADR) mode and a subsequent NVDIMM battery mode, as are known in the art. Such modes are beyond the scope of the present disclosure and will not be further described herein except as needed to describe the present embodiments. At the time T3 when the charge on the power storage device reaches the static peak limit, the power management system institutes a more drastic reduction in the peak power limit, for example by asserting various hardware control signals of a hardware control loop as described above to place the information handling system at a very low peak power limit, here shown as 300 W. This peak power limit level is provided so that the PAU can enter an unrestricted recharge mode to recharge the power storage device, as is indicated by the rising charge level. In a particular embodiment, the power management system keeps the peak power level at the low level until the power storage element has recharged sufficiently that the PAU can resume operating in the peak assist mode. It will be understood that the PAU may resume operating in the peak assist mode when the charge on the power storage device achieves a charge level that is equal to or greater than the charge level at which the power management system began lowering the peak power limit. In another embodiment, the power management system may implement various intermediate thresholds for restoring the information handling system to the mode where the peak power limit is within the range of the CPU maximum current mechanism, as needed or desired.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware.

An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   power assist unit coupled to a power rail, the power assist unit including:
      a power storage element;
      a converter coupled to the power storage element and to the power rail; and
      a controller,
   power assist hardware enable logic gates configured to receive a power OK signal from a power supply unit and a constant-current signal from the power supply unit, and to provide an enable signal to the power assist unit based upon the power-OK signal and the constant-current signal, wherein, when the power assist unit receives the enable signal, the controller is configured 1) to determine that a charge level on the power storage element is above a peak charge level threshold, to receive a current level indication indicating a current provided to a load of the information handling system by a power supply unit, and to direct the converter to provide power from the power storage element to the power rail when the charge level is above the peak charge level, and 2) to direct the converter to charge the power storage element from the power rail at a maximum charge rate ($C_R$) when the charge level on the power storage element is below the peak charge level threshold, and to provide a charge level indication that indicates an amount of charge on the power storage unit, wherein the maximum charge rate ($C_R$) is given as:

$$C_R = P_{Available} - P_{Budget}$$

where ($P_{Available}$) represents a maximum available power based upon the current level indication and ($P_{Budget}$) represents a power budget for the information handling system; and a baseboard management controller configured to receive the charge level indication, and to set a peak power limit for power consumed by the load based on the charge level indication.

2. The information handling system of claim 1, wherein setting the peak power limit is further in response to the charge level indication being below a first threshold.

3. The information handling system of claim 2, wherein the baseboard management controller sets the peak power limit to a maximum value when the charge level indication is above the first threshold.

4. The information handling system of claim 2, wherein in setting the peak power limit, the baseboard management controller is further configured to set a power limit of a processor of the information handling system.

5. The information handling system of claim 4, wherein the information handling system is configured to set the information handling system to a system-wide low power mode when the charge level indication is below a second threshold, the second threshold being lower than the first threshold.

6. The information handling system of claim 1, wherein the power storage element comprises a supercapacitor.

7. The information handling system of claim 1, wherein the power storage element comprises a rechargeable battery.

8. A method, comprising:
   coupling a power supply unit to a power rail of an information handling system, wherein
      the power supply unit is configured to provide up to a maximum power ($P_{Available}$) to a load of the information handling system;
   coupling a power storage element of power assist unit of the information handling system to a converter of the power assist unit:
   coupling the converter to the power rail;
   receiving, by power assist enable logic gates, a power-OK signal from the power supply unit and a constant-current signal from the power supply unit;
   providing, by the power assist enable logic, an enable signal to the power assist hardware;
   in response to receiving by the power assist unit the enable signal,
   determining, by a controller of the power assist unit, that a charge level on the power storage element is above a peak charge level threshold;
   receiving, by the controller, a current level indication indicating a current provided to a load of the information handling system in response to determining that the charge level is above the peak charge level threshold;
   directing, by the controller, the converter to provide power from the power storage element to the power rail when the charge level is above the peak charge level threshold;
   directing, by the controller, the converter to charge the power storage element at a maximum charge rate (CR) from the power rail when the charge level is below the peak charge level threshold, wherein the maximum charge rate (CR) is given as:

$$C_R = P_{Available} - P_{Budget}$$

where ($P_{Available}$) represents a maximum available power based upon the current level indication and $P_{Budget}$ represents a power budget for the information handling system;
providing a charge level indication that indicates an amount of charge on the power storage element;
receiving, by a baseboard management controller of the information handling system, the charge level indication; and
setting a peak power limit for power consumed by the load based on the charge level indication.

9. The method of claim 8, wherein setting the peak power limit is further in response to the charge level indication being below a first threshold.

10. The method of claim 9, further comprising:
setting the peak power limit to a maximum value when the charge level indication is above the first threshold.

11. The method of claim 9, wherein in setting the peak power limit, the method further comprises:
setting a power limit of a processor of the information handling system.

12. The method of claim 11, further comprising:
setting, by the information handling system, the information handling system to a system-wide low power mode when the charge level indication is below a second threshold, the second threshold being lower than the first threshold.

13. The method of claim 8, wherein the power storage element comprises a supercapacitor.

14. The method of claim 8, wherein the power storage element comprises a rechargeable battery.

15. An information handling system, comprising:
power supply configured to provide a power rail to power a load of the information handling system, and to provide a current level indication indicating a current provided to the load by the power supply wherein the power supply unit is configured to provide up to a maximum power ($P_{Available}$) to a load of the information handling system;
power assist unit coupled to the power rail, the power assist unit including:
a power storage element; a converter coupled to the power storage element and to the power rail; and a controller;
power assist hardware enable logic gates configured to receive a power OK signal from a power supply unit and a constant-current signal from the power supply unit, and to provide an enable signal to the power assist unit based upon the power-OK signal and the constant-current signal, wherein, when the power assist unit receives the enable signal, the controller is configured to receive the current level indication, 1) to determine that a charge level on the power storage element is above a peak charge level threshold, to direct the converter to provide power from the power storage element to the power rail when the charge level is above the peak charge level threshold, and 2) to direct the converter to charge the power storage element at a maximum charge rate ($C_R$) from the power rail when charge level is below the peak charge level threshold, and to provide a charge level indication that indicates an amount of charge on the power storage element, wherein the maximum charge rate ($C_R$) is given as:

$C_R = P_{Available} - P_{Budget}$ where ($P_{Available}$) represents a maximum available power based upon the current level indication and $P_{Budget}$ represents a power budget for the information handling system; and
a baseboard management controller configured to receive the charge level indication, and to set a peak power limit for power consumed by the load based on the charge level indication.

16. The information handling system of claim 15, wherein setting the peak power limit is further in response to the charge level indication being below a first threshold.

17. The information handling system of claim 16, wherein the baseboard management controller sets the peak power limit to a maximum value when the charge level indication is above the first threshold.

18. The information handling system of claim 16, wherein in setting the peak power limit, the baseboard management controller is further configured to set a power limit of a processor of the information handling system.

19. The information handling system of claim 18, wherein the information handling system is configured to set the information handling system to a system-wide low power mode when the charge level indication is below a second threshold, the second threshold being lower than the first threshold.

20. The information handling system of claim 15, wherein the power storage element comprises one of a supercapacitor and a battery.

* * * * *